United States Patent [19]

Akita et al.

[11] 4,201,087
[45] May 6, 1980

[54] APPARATUS FOR MEASURING TEMPERATURE

[75] Inventors: Sigeyuki Akita, Nukata; Hisato Wakamatsu, Toyota, both of Japan

[73] Assignee: Nippon Soken, Inc., Nishio, Japan

[21] Appl. No.: 924,229

[22] Filed: Jul. 13, 1978

[30] Foreign Application Priority Data

Jul. 20, 1977 [JP] Japan .................. 52/87087

[51] Int. Cl.² ............................................. G01K 11/00
[52] U.S. Cl. ................................................ 73/339 A
[58] Field of Search ............................ 73/339 A, 597

[56] References Cited

U.S. PATENT DOCUMENTS

| 2,894,595 | 7/1959 | Brown | 73/597 |
|---|---|---|---|
| 3,690,155 | 9/1972 | Eichler | 73/597 |
| 3,762,197 | 10/1973 | Roof | 73/597 |

FOREIGN PATENT DOCUMENTS

465562  6/1975  U.S.S.R. .................. 73/339 A

Primary Examiner—S. Clement Swisher
Attorney, Agent, or Firm—Cushman, Darby & Cushman

[57] ABSTRACT

An apparatus for measuring the temperature of a medium such as air or the like by the use of a change in the propagation speed of an ultrasonic sound wave depending on the temperature change of the medium. An acoustic transmitter transmits a carrier as an ultrasonic sound wave continuously through the medium to a receiver by exciting an ultrasonic wave vibrator with a series of pulses which constitute the carrier. The received ultrasonic wave when amplified exhibits a series of pulses having a constant signal level irrespective of a change in the amplification factor of the amplifier in the receiver.

6 Claims, 13 Drawing Figures

APPARATUS FOR MEASURING TEMPERATURE

BACKGROUND OF THE INVENTION

The present invention relates to a temperature measurement apparatus in which the temperature of a medium such as air is measured by detecting a change with temperature in its acoustic wave propagation speed.

Figure 9A:
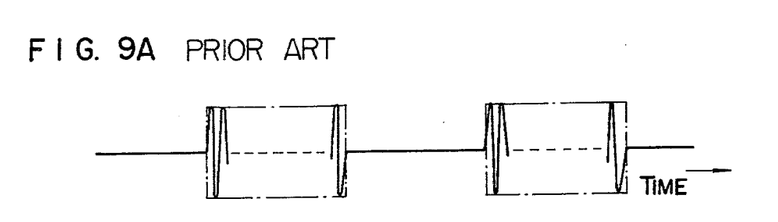
FIG. 9 shows signal waveforms illustrating the operation of prior art devices.
Figure 9B:
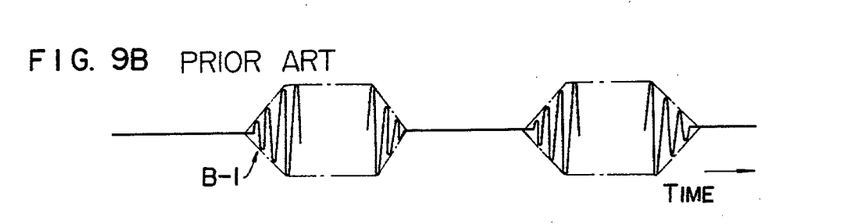

Heretofore, there have been disclosed such devices according to prior art, in which, an output signal of a carrier wave generator is frequency-modulated by means of a low frequency variable-frequency generator to provide a modulated wave for exciting an ultrasonic vibrator, thus causing an ultrasonic wave of about 40 KHz as shown in a waveform of FIG. 9A to be sent therefrom intermittently; the ultrasonic wave is received by a receiver and amplified to obtain a signal as shown in FIG. 9B. The amplified signal is passed through a frequency discriminator to obtain a modulating wave. The modulating wave thus obtained is compared with respect to its phase so as for its modulation frequency to be varied so that the distance between the acoustic transmitter and the receiver is an integral multiple of the wavelength of the modulating wave and so that the established frequency indicates the propagation speed and thus the temperature of the medium between the transmitter and the receiver.

Figure 9C:
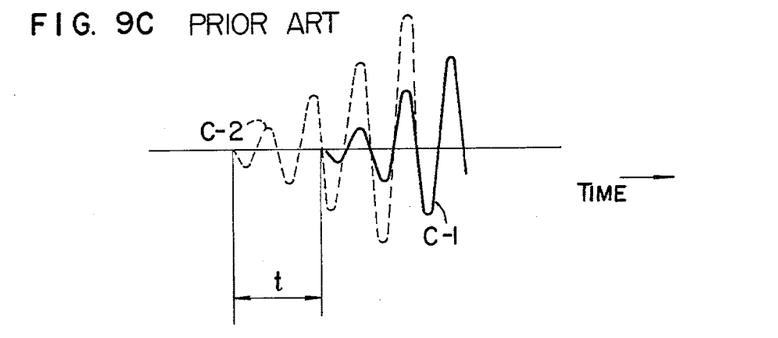

However, in these prior art devices, a time duration for building up a signal as shown at B - 1 in FIG. 9B, is necessary between the time when the receiver receives the carrier wave and that when an output waveform having a fixed level is established. As a result, when not only the medium to be measured but also the whole measurement circuit are subject to a considerable change of temperature, for example, a waveform shown as C - 1 in FIG. 9C which is received and amplified in the receiver at a temperature of To will be evidently shifted as shown as the waveform C - 2 in FIG. 9C as the temperature is varied to increase the amplification factor of the amplifier. Thus, a phase difference or time difference t is caused due to a change in the performance of the measurement circuit, that is, a problem that a true change in the acoustic wave propagation speed cannot be detected precisely is raised.

SUMMARY OF THE INVENTION

The present invention is intended to eliminate the above-mentioned problem. In the first aspect of the present invention, an acoustic transmitting means and a receiving means sends and receives, respectively, a carrier wave in the form of an ultrasonic wave continuously at all times whereby an output waveform always having a fixed level can be provided independently of the environmental temperature and thus the change in the acoustic wave propagation speed can be detected always with stability and accuracy for measuring the temperature of the medium to be measured.

The second aspect of the present invention has a sensor circuit which is provided with a transmitting and receiving means for sending and receiving constantly a carrier wave as an ultrasonic wave, and an operation circuit which determines the temperature of the medium to be measured by the phase difference between the sent and received signals, whereby a pulse signal having a frequency of twice the excitation frequency of the ultrasonic vibrator is supplied from the operation circuit through signal lines to the sensor circuit where the pulse signal is frequency-divided through a factor of ½ to form an excitation signal, so that the sensor circuit and the operation circuit can be disposed at a distance from each other and the temperature of the medium to be measured can be determined always with stability and accuracy.

Further, in the third aspect of the present invention, a phase difference detecting signal from the sensor circuit is high-frequency modulated in the operation circuit and the modulated pulses are counted successively for every definite time interval, whereby the mean value over the definite intervals is displayed. Thus, the temperature of the medium to be measured can be displayed with stability at a remote distance.

Since, in the first aspect, there are provided an acoustic transmitting means which continuously sends an ultrasonic wave, a receiving means which receives the carrier wave from the transmitting means through a medium to be measured, and a determination circuit which detects through the corresponding pulse width the phase difference at a predetermined time between the series of signals sent from the transmitting means and those received by the receiving means and determines by the detected pulse width the temperature of the medium to be measured, and the transmitting means and the receiving means sends and receives, respectively, the carrier wave constantly without interruption; the receiving means can constantly provide an output waveform having a fixed level independently of the environmental temperature and thus the change in the acoustic wave propagation speed can be detected with stability and accuracy so as to measure the temperature of the medium to be measured. Further, if there is provided a temperature determination circuit as the above-mentioned determination circuit in which a phase difference detecting signal corresponding to the phase difference is high-frequency modulated and the number of the modulated pulses is counted for determining the temperature of the medium to be measured, the pulse width corresponding to the phase difference detecting signal can be detected reliably and the accuracy of detecting the pulse width can be varied easily by a simple adjustment.

In the second aspect, there are provided a sensor circuit and an operation circuit; the sensor circuit having a signal forming circuit which receives a pulse signal from a first signal line and forms an excitation signal having a frequency obtained by frequency-dividing by a factor ½ the pulse signal for exciting the ultrasonic vibrator and a predetermined synchronizing signal, a transmitting means which can perform constantly the transmitting operation with the excitation signal, a receiving means which receives the carrier wave from the transmitting means through the medium to be measured, and a phase difference detecting and processing circuit which detects by means of the synchronizing signal the phase difference, with respect to the corresponding pulse width, between a series of the excitation signals and a series of the signals received by the receiving means; and the operation circuit having a high frequency generator which sends the pulse signal of a predetermined frequency through the first signal line, and a determination and processing circuit which determines the temperature of the medium to be measured by means of the phase difference detecting signal provided from the sensor circuit through the second signal line. Thus, since the pulse signal having a frequency equal to twice the excitation frequency of the ultrasonic vibrator is sent from the operation circuit to the sensor circuit, the sensor circuit can be supplied with constant electric power having an ON-OFF ratio of one to one independently of disturbances, for example, in the distributed capacity of the first signal line, even if the sensor circuit and the operation circuit are at a distance from each other; that is, the signal forming circuit in the sensor circuit performs its operation constantly with stability and reliability and the carrier wave can be constantly sent and received just as in the first aspect so that the phase difference between the series of the sent signals and the series of the received signals can be detected. As a result, the temperature of the medium to be measured can be measured with stability and reliability even at a remote distance.

Further, in the third aspect, there are provided, in addition to the sensor circuit described with reference to the second aspect, a high frequency generator which supplies the pulse signal having a predetermined frequency through the first signal line to the sensor circuit, a modulation circuit which high-frequency modulates by means of the signal from the high frequency generator the phase difference detecting signal obtained from the sensor circuit through the second signal line, a temperature determination and processing circuit which counts successively the modulated pulses from the modulation circuit for every definite time interval and determines by means of the counted value the temperature of the medium to be measured, and an operation display circuit including a display means which display digitally in a predetermined temperature unit the determination signal from the temperature determination and processing circuit; whereby the mean value of the temperature over a definite time interval can be displayed. Thus, the temperature of the medium to be measured can be constantly displayed with stability even at a remote distance.

BRIEF DESCRIPTION OF THE DRAWINGS

The accompanying drawings illustrated embodiments of a temperature measurement apparatus according to the present invention and the prior art device, in which.

DETAILED DESCRIPTION OF THE PREFERRED EMBODIMENT

Figure 1:
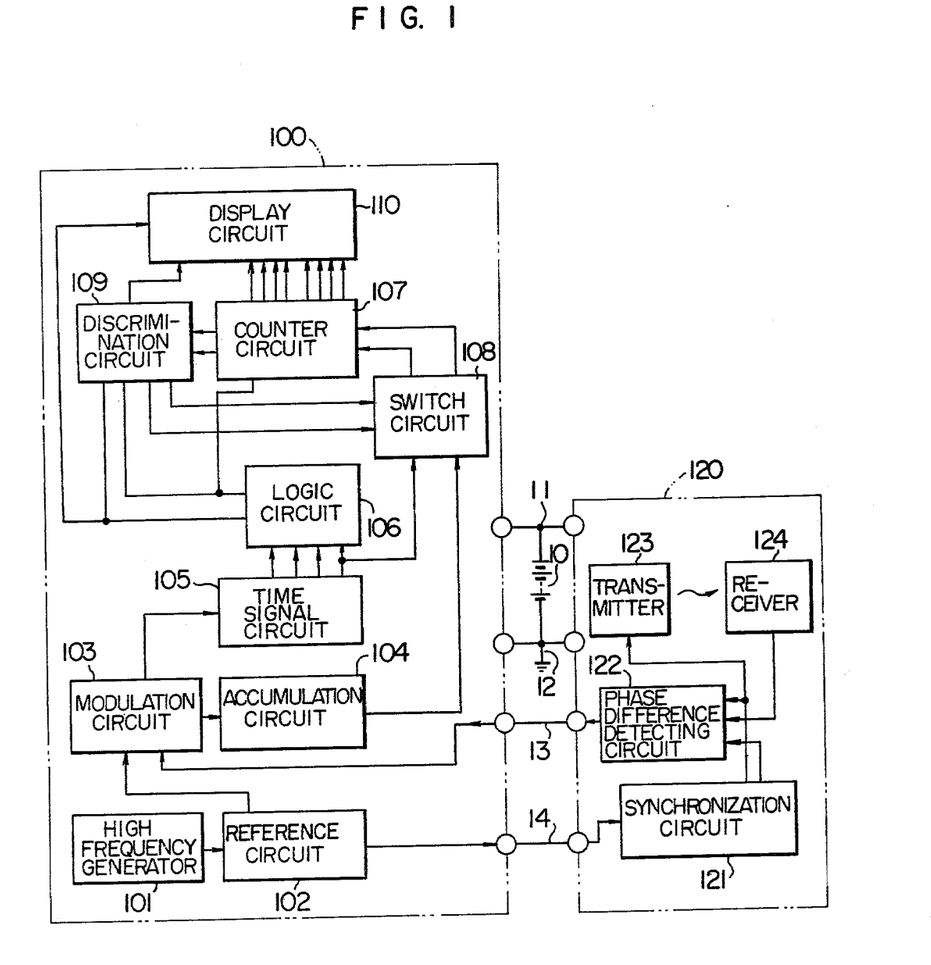
FIG. 1 is a block diagram showing the general constitution of an embodiment of the invention, FIGS. 2A, 2B and 2C comprise an entire electrical circuit diagram showing the detailed electrical connection in the block diagram of FIG. 1, FIGS. 3 to 8 show signal waveforms at some portions in the circuit diagram and are helpful to illustrate the operation of the apparatus according to the present invention.

Now, the present invention will be described with respect to an embodiment shown in the drawings. In FIG. 1, which is a block diagram showing the general constitution, a block 100 is an operation display circuit and a block 120 is a sensor circuit, both of which are supplied with electric power from an electric power source 10 through power lines 11 and 12 and are connected with each other through signal lines 13 and 14 for sending and receiving signals. In the operation display circuit 100, numeral 101 is a high frequency generator, numeral 102 is a reference circuit which divides the oscillation frequency to derive a frequency (hereinafter referred to as reference frequency) equal to twice the excitation frequency for the sensor circuit 120, numeral 103 is a modulation circuit which modulates the high frequency oscillation frequency by means of a phase difference signal from the sensor circuit 120, numeral 104 is an accumulation circuit which accumulates the modulated pulse signal, numeral 105 is a time signal circuit which supplies a signal every definite time interval, numeral 106 is a logic circuit which supplies a memory signal and a reset signal in response to the time signal, numeral 107 is a counter signal which counts the number of the pulses accumulated in the accumulation circuit 104, numeral 108 is a switch circuit which switches the number of the accumulated pulses depending on whether the temperature of medium air is positive or negative, numeral 109 is a discrimination circuit which discriminates whether the temperature of medium air is positive or negative, and numeral 110 is a display circuit which displays the temperature of medium air.

Next, in the sensor circuit 120, numeral 121 is a synchronization circuit which divides the reference frequency from the operation display circuit 100 by a factor of $\phi$ to provide the excitation frequency for the ultrasonic vibrator and further provides a synchronizing signal for detecting the phase difference between the signals sent from a transmitter 123 and those received by a receiver 124, both being continuously sending and receiving the excitation frequency, numeral 122 is a phase difference detecting circuit which detects the phase difference between the signals sent to the transmitter 123 and the signals provided by the receiver 124.

Figure 2A:
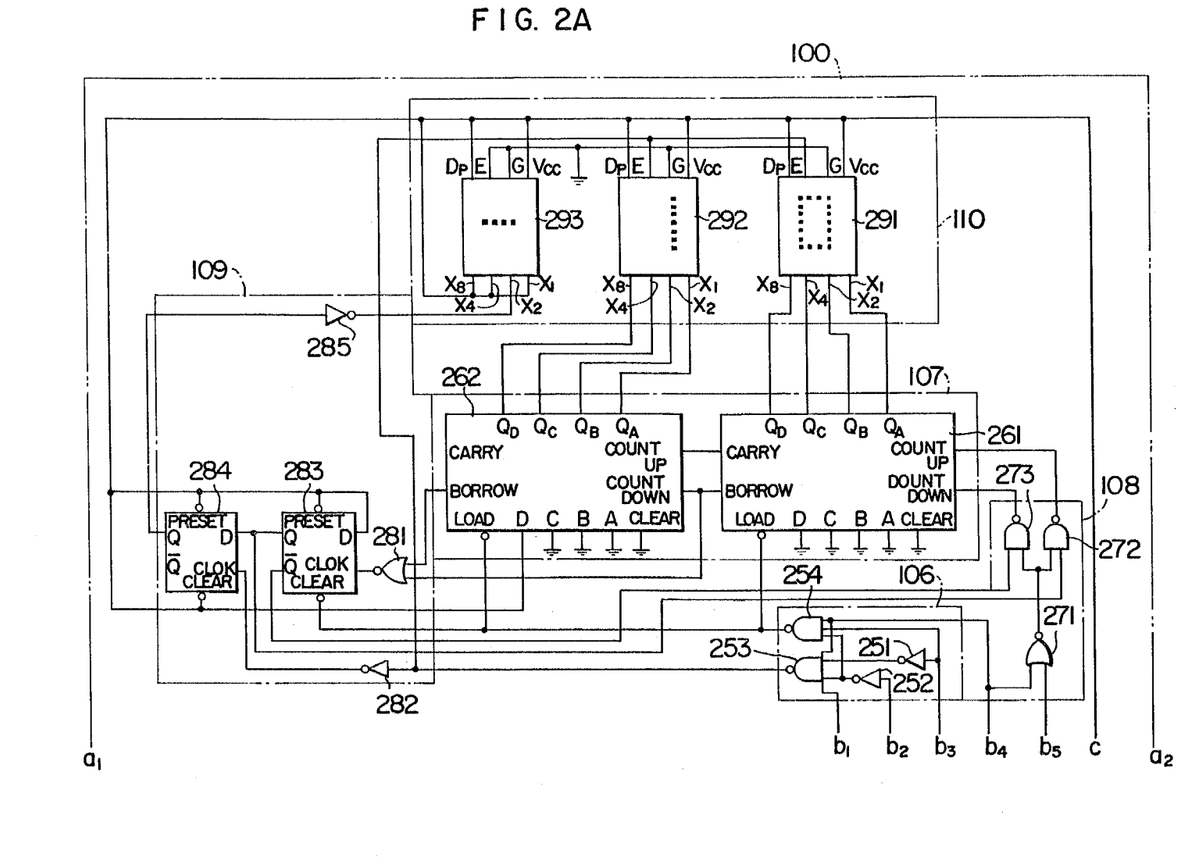
Figure 2B:
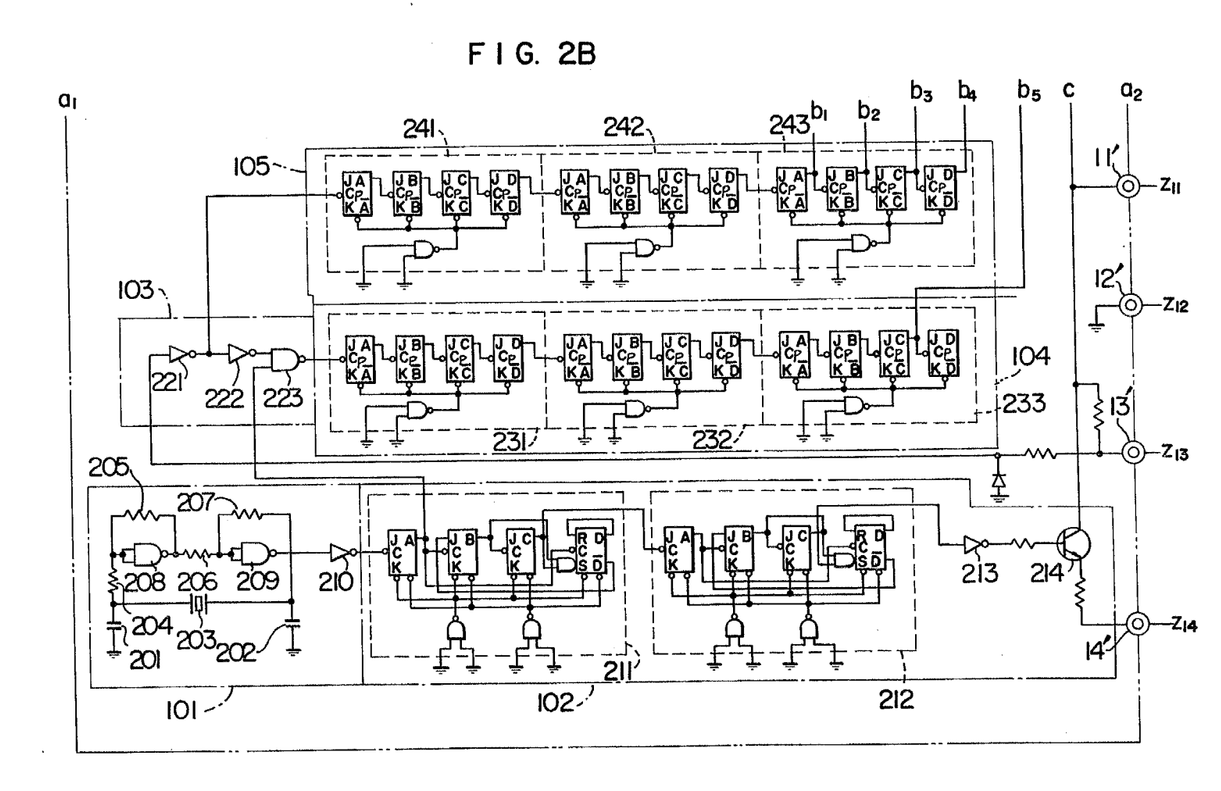
Figure 2C:
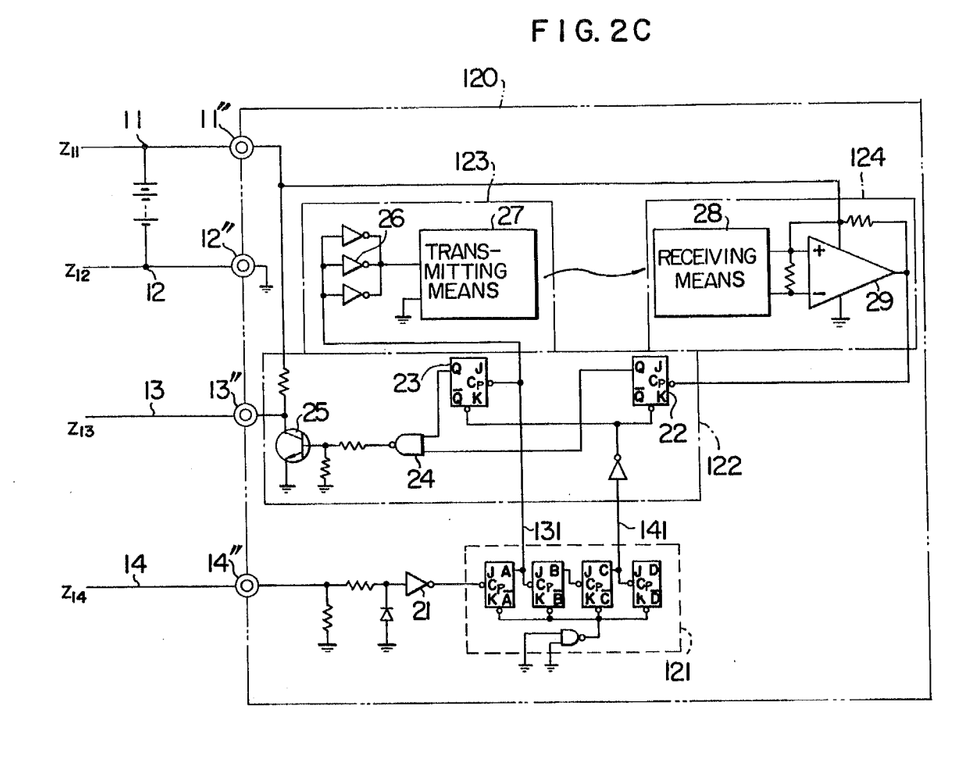
Figure 3:
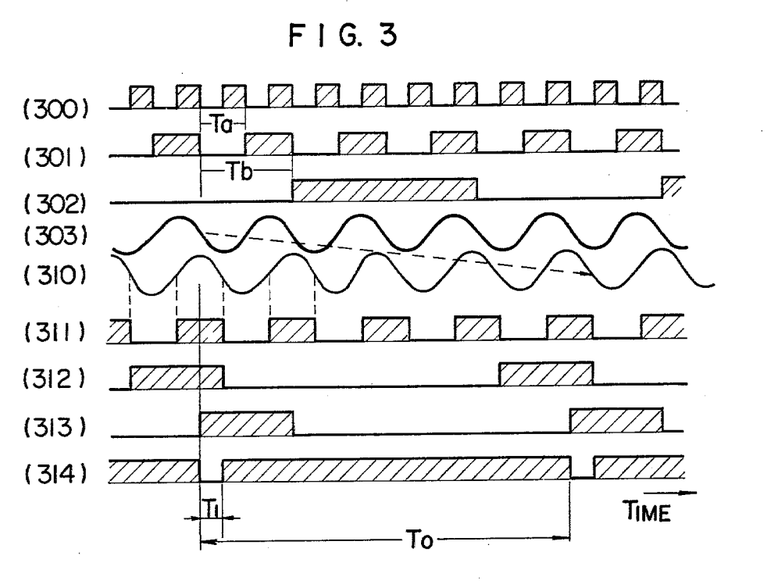

Next, the details of the above-described constitution and its operation will be described with reference to FIG. 2 which is an entire electrical circuit diagram of the apparatus according to the present invention. In FIG. 2, the high frequency generator 101 is a known oscillation circuit using a crystal oscillator and includes a crystal oscillator 203, capacitors 201 and 202, resistors 204, 205, 206 and 207, gates 208 and 209, and an inverting and amplifying inverter gate 210. This oscillation pulse signal is frequency-divided by a factor of 1/100 through the reference circuit 102, which includes decode counters 211 and 212, an inverter gas 213 and a transistor 214, so that a reference signal waveform which is obtained by inverting the waveform (300) in FIG. 3 appears at a terminal 14'. In this embodiment, two IC SN7490s manufactured by TEXAS INSTRUMENTS (hereinafter referred to as TI), USA are cascade connected as the decode counters 211 and 212 for providing the 1/100 frequency-divided signal. This reference signal reaches a terminal 14'' of the sensor circuit 120 where the reference signal is shaped by an inverter gate 21 at the output of which a signal as shown by (300) in FIG. 3 appears. This reference signal 300 reaches the input of the synchronization circuit 121 including a frequency-dividing circuit (SN 7493 manufactured by TI) and a ½ frequency-divided signal shown by (301) in FIG. 3 and a ¼ frequency-divided signal shown by (302) in FIG. 3 are provided over lines 131 and 141, respectively. The signal 301 is supplied to the transmitter 123 where the signal 30 is passed through a power amplifier having three inverter gates 26 connected in parallel to excite an ultrasonic vibrator of a transmitting means 27, so that an ultrasonic wave shown by (303) in FIG. 3 is continuously radiated from the transmitting means 27. The transmitting means 27 and a corresponding receiving means 28 are both known ones conventionally used for sending and receiving ultrasonic waves, respectively. The reason why the reference signal is frequency-divided by a factor of $\frac{1}{2}$ to form the excitation frequency is that, even if, for example, the locations of the operation display circuit 100 and the sensor circuit 120 are at a distant from each other and each period (Ta in FIG. 3 (300)) of the signal waveform reaching the terminal 14" of the sensor circuit 120 is caused by the distributed capacity or the like of the signal line 14 connecting these portions to have an ON-OFF ratio different from one to one, each period (Tb in FIG. 3 (301)) of the $\frac{1}{2}$ frequency-divided output signal has an ON-OFF ratio of one to one so that the transmitting means 27 can provide constantly a definite electric power. This is a manner of processing in the case that, as described above, the signal line 14 is long (for example, several meters) and, of course, it is not necessarily required that, in the case the signal line 14 is short and its distributed capacity is small, the processing of $\frac{1}{2}$ frequency-division is made in the sensor circuit 120.

The ultrasonic wave which is constantly sent from the transmitting means 27 is received by the receiving means 28, whose output provides constantly a signal, shown by (310) in FIG. 3, corresponding to the received ultrasonic wave. The signal 310 is supplied to the inversion input and the non-inversion input of a comparator 29, whose output provides a waveform, shown by (311) in FIG. 3, which is similar to but different in phase from that of the carrier wave 301. Then, the continuous wave signal (310) from the receiving means 28 is made to oscillate with the zero voltage centered, whereby the comparator 29 provides the pulse signal waveform 311 which varies in dependence on the change in polarity of the input signal 310. Thus, even if the comparator 29 has a temperature drift, its output is never influenced by the drift.

Thus, the carrier wave 301 and the received waveform 311 reach the clock terminals CP of j-k flip-flop 22 and 23 of the phase difference detecting circuit 122. Since the clear terminals of the j-k flip-flop 22 and 23 have been supplied with the inverted waveform of the synchronizing signal shown in FIG. 3 (302), a signal shown by (312) in FIG. 3 appears every time interval To at the output Q of the flip-flop 22 while a signal shown by 313 in FIG. 3 appears every time interval To at the output Q of the flip-flop 23. These signals 312 and 313 reach the inputs of a NAND gate 24. As a result, a signal having a phase difference $T_1$, shown by (314) in FIG. 3, appears every time interval To at the output of the NAND gate 24.

Figure 4:
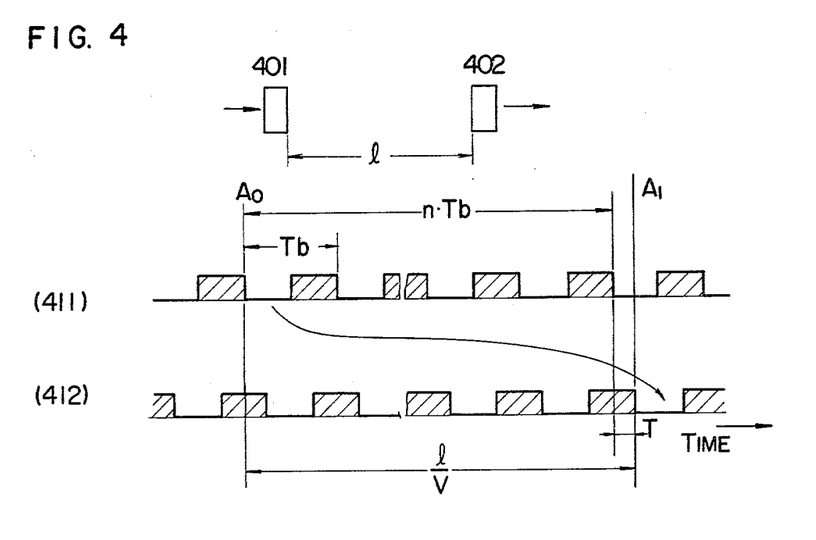

Now, this phase difference will be described with reference to FIG. 4. In FIG. 4, if a transmitting means 401 and a receiving means 402 are spaced from each other by a definite length l and a signal which was sent by the transmitting means 401 at the time Ao on the carrier wave 411, the time interval t from the time Ao to the time A₁ is given by $t = l/v$ (where, v is the speed of sound). Since n pulses (n=0, 1, 2, - - -) are sent from the transmitting means 401 during this time interval t, the pulse signal or the series of pulses have a phase difference of $T = (l/v) - n \cdot T_b$ (where, $T_b$ is the period of the pulse signal) between the receiving means 402 and the transmitting means 401. From the above-mentioned relation, it is evident that the phase difference T varies with the speed of sound v, that is, the temperature of air.

Further, as is evident from the above-described formula of the phase difference T, the phase difference T depends considerably also on the distance l, in particular, increases with the increasing distance l and thus the accuracy of detection is also increased. However, on the other hand, when the distance l is increased, the variation in the detected phase difference T caused by the variation in the temperature distribution or the like due to the air flow between the transmitting and receiving means is increased, and thus the temperature of air cannot possibly be detected when a variation in the air flow is significant at the measurement point. Thus, the distance l must be suitably determined by taking into consideration the degree of variation in the temperature distribution of the object to be measured and by taking into consideration the period of the carrier wave. Some experimental results in this embodiment show that the distance l is suitably 24 to 30 mm for the carrier wave of 40 kHz. In general, if the values of the distance l satisfy the equation; $l = n \cdot T_b + T$ (where, T is the phase difference, $T_b$ is the period of the synchronizing signal, and n=0, 1, 2, . . . ), then these values may be used.

Figure 5:
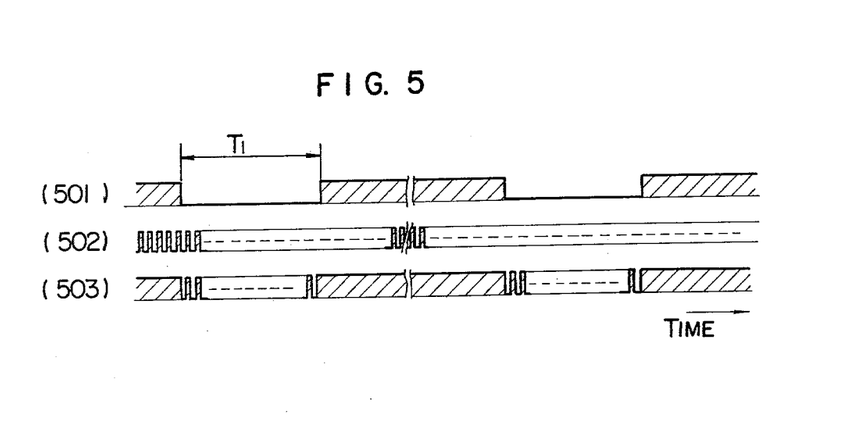

Now, the phase difference detecting signal is supplied from the terminal 13" of the sensor circuit 120 through the signal line 13 to the terminal 13' of the operation display circuit 100. Thus, a phase difference detecting signal shown by (501) in FIG. 5 appears at the output of an inverter gas 221 of the modulation circuit 103. This signal shown by (501) in FIG. 5 is the same as that shown by (314) in FIG. 3 with the time scale magnified. A NAND gate 223 which modulates a high frequency signal 502 from the reference circuit 102 with this signal 501 provides at its output a modulated pulse signal 503 with the $T_1$ interval superposed with high frequency pulses. Thus, it is evident that, if the phase difference $T_1$ is varied by the variation in the temperature of air, the number of the high frequency pulses present in the $T_1$ interval is correspondingly varied. Then, as the frequency of the high frequency signal 502 is increased, the number of the high frequency pulses is increased thus causing the accuracy of detecting the phase difference $T_1$ to be increased. The output signal 501 of the inverter gate 221 is also supplied to the signal circuit 105, which counts the pulse signal 501 by $2^m$ (by $2^{12}$ in this example) to form a time signal of a definite time. The signals $2^{m-3}$, $2^{m-2}$, $2^{m-1}$ and $2^m$ are shown by (601), (602), (603) and (604) in FIG. 6.

Figure 6:
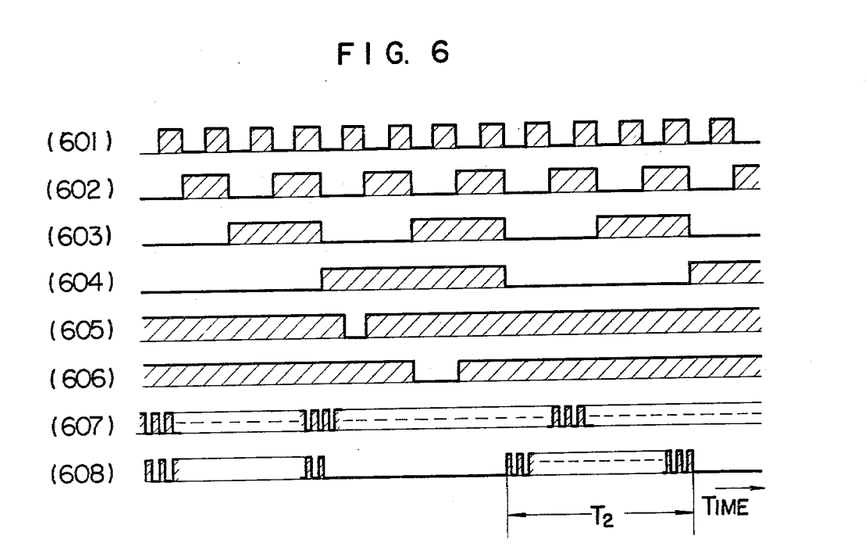

Each of these signals is supplied to the logic circuit 106 including an inverter gates 251 and 252 and NAND gates 253 and 254, in which, a memory signal shown by (605) in FIG. 6 and a reset signal shown by (606) in FIG. 6 appear at the outputs of the NAND gate 253 and the NAND gate 254, respectively. The signal 604 is supplied to one input of a NOR gate 271 of the switch circuit, while the other input receives the output signal 607 of the accumulation circuit 104 which has accumulated the modulated pulse signal by $2^{m-1}$ pulses. Thus, a signal shown by (608) in FIG. 6 appears at the output of the NOR gate 271. It is evident that the number of pulses present in the interval $T_2$ in (608) of FIG. 6 is equal to the means value of the number of pulses present in the interval $T_1$ of the modulated pulse signal 503 averaged over the time interval $t_1$ ($t_1 = To \times 2^m$). This modulated pulse signal 503 is accumulated in the accumulation circuit 104 during the time interval $t_1$ determined by the time signal circuit 105 so that the mean value of the phase difference over the time interval $t_1$ is derived.

The reset signal 606 which is the output signal of the NAND gate 254 causes a D type flip-flop 283 in the discrimination circuit 109 to be at the initial state, so that its outputs Q and $\overline{Q}$ become "0" and "1", respectively, and as these signals Q and $\overline{Q}$ reach the inputs of the NAND gates 272 and 273 of the switch circuit 108, respectively, the gate of the NAND gate 272 is closed while the gate of the NAND gate 273 is opened. Thus, a signal shown by (701) in FIG. 7 appears at the output of the NAND gate 273. This signal 701 reaches the COUNT DOWN terminal of an up-down counter 261 such as DECADE UP/DOWN COUNTERS (TI 74192, USA) in the counter circuit 107. The BORROW terminal of the up-down counter 261 provides one pulse every time ten pulses have reached the COUNT DOWN terminal. The output signal of the BORROW terminal is supplied to the COUNT DOWN terminal of the next stage up-down counter 262, so that the up-down counter 261 represents "the first order" while the up-down counter 262 represents "the second order". The same is valid also when the COUNT UP terminals are supplied with signals for up-counting.

Now, assume that the data inputs A, B, C and D of the counter 261 are all "0" and the data inputs A, B and C of the counter 262 are "0" while the data input D of the counter 262 is "1". Thus, when the data inputs are set to be "80", the outputs varies to be 79→78→77→ . . . as pulses reach the COUNT DOWN terminal of the counter 261. When the reset signal 606 shown in FIG. 7 reaches the LOAD terminals of the counters 261 and 262; at the time B$_1$, the outputs Q$_A$, Q$_B$, Q$_C$ and Q$_D$ of the counter 261 all provide "0" signals and the outputs Q$_A$, Q$_B$ and Q$_C$ of the counter 262 provide "0" signals while the data output Q$_D$ of the counter 262 provides "1" signal. The output signal 701 of the NAND gate 273 reaches the COUNT DOWN terminal of the counter to cause the outputs Q$_A$, Q$_B$, Q$_C$ and Q$_D$ of the counter 261 to change as shown by (702), (703), (704) and (705) in FIG. 7, while the signal 706 appearing at the BORROW terminal of the counter 261 causes the outputs Q$_A$, Q$_B$, Q$_C$ and Q$_D$ of the counter 262 to change as shown by (707), (708), (709) and (710) in FIG. 7.

Figure 7:
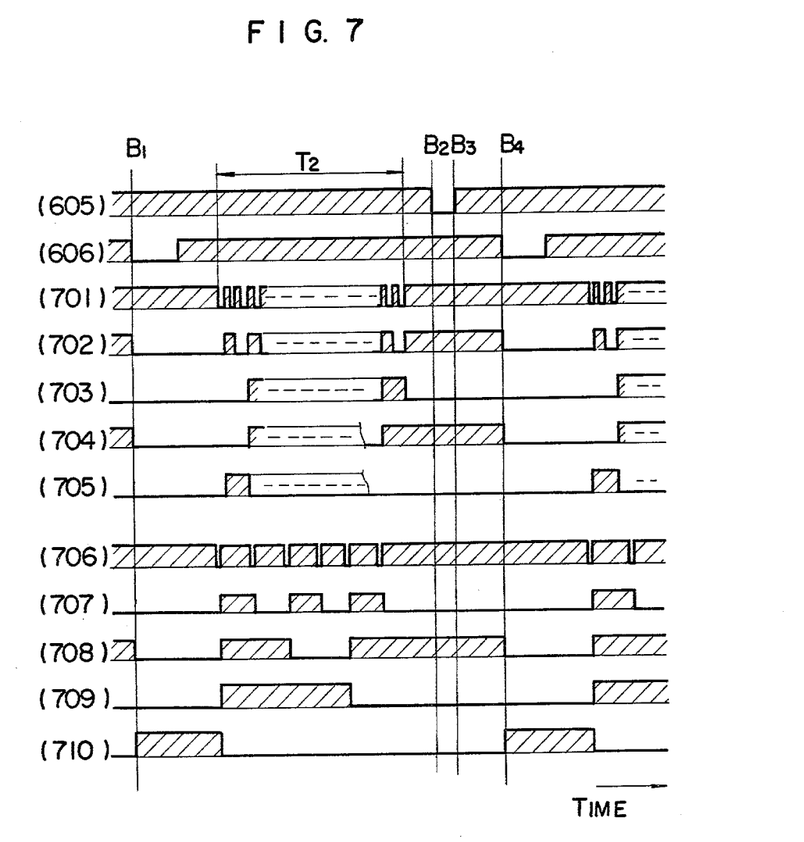

Now, assuming that fifty-five pulses are present in the interval T$_2$; the outputs Q$_A$, Q$_B$, Q$_C$ and Q$_D$ of the counter 261 are "1", "0", "1" and "0", respectively, and the outputs Q$_A$, Q$_B$, Q$_C$ and Q$_D$ of the counter 262 are "0", "1", "0" and "0", respectively, so that the entire output represents 80−55=25 during the time interval between B$_2$ and B$_3$. These output signals reach the inputs of light-emitting diode display means 291 and 292 (YOKOGAWAHEWLETT-PACKARD 7300) which represent, respectively, "the first order" and "the second order" in the display circuit 110.

Since these display means 291 and 292 have been supplied at their ENABLE terminals with the memory signals 605 shown by (605) in FIG. 7, these display means 291 and 292 light the light-emitting diodes in response to the input code signals in the case of the memory signal 605 being "0" for displaying and further memorize the state. Thus, the display means 291 displays the figure "5" while the display means 292 displays the figure "2", so that the temperature of air as a medium to be measured is displayed to be 25° C. When the time B$_4$ in FIG. 7 is reached, the counters 261 and 262 are set to be in the initial state so that the same operation as described above may be made and thus a display corresponding to the outputs of the counters 261 and 262 may be made. Assuming, for example, that the temperature of air as a medium to be measured is increased thus causing the time interval T$_1$ in the phase difference detecting signal 314 shown in FIG. 3 to be narrowed so that the number of pulses present in the interval T$_2$ in FIG. 7 becomes twenty-five; the outputs Q$_A$, Q$_B$, Q$_C$ and Q$_D$ of the counter 261 are "1", "0", "1" and "0", respectively, and the outputs of the counter 262 are "1", "0", "1" and "0", respectively, so that the entire output represents 80−25=55 during the time interval between B$_2$ and B$_3$ just as the abovedescribed operation. Thus, the display means 291 and 292 both display the figures "5", which means that the temperature of air is 55° C.

Figure 8:
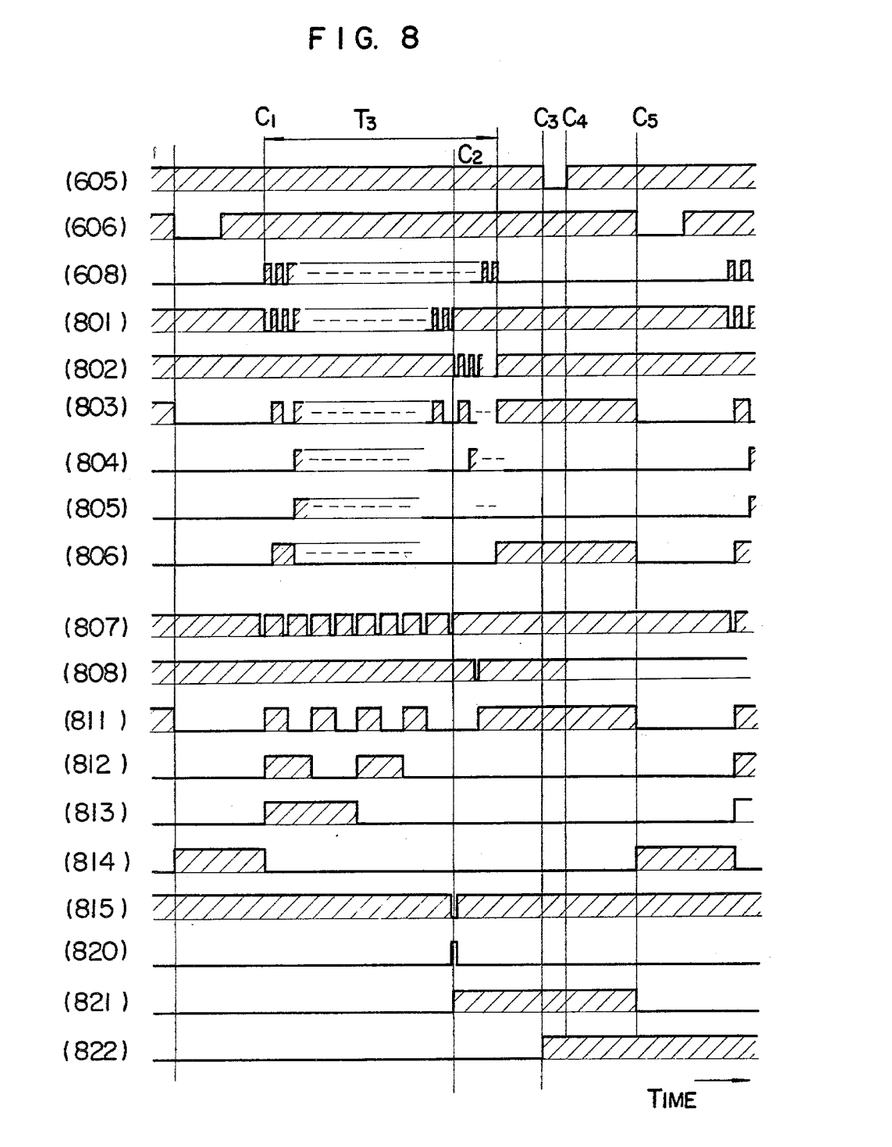

Next, assume that the temperature of air as a medium to be measured is decreased to reach a negative value in the centigrade unit (°C.). Then, it is evident from the hereinbefore-described formula $T=1/\nu-n\cdot T_b$ that the interval T$_1$ in the phase difference detecting signal 314 shown in FIG. 3 is widened. Assume further that the modulated signal is accumulated so that the number of pulses present in the interval T$_3$ (the same as the interval T$_2$ in FIG. 7) of the output signal of the NOR gate 271 shown by (608) in FIG. 8 is ninety-nine. The manner shown in FIG. 8 is just the same as described above, in which, starting from the time C$_1$, the output signal 801 of the NAND gate 273 reaches the COUNT DOWN terminal of the counter 261 and the outputs of the counters 261 and 262 change as shown by (803), (804), (805), (806), (807), (811), (812), (813) and (814) in FIG. 8.

In this case; at the time C$_2$ when eighty pulses have reached the COUNT DOWN terminal of the counter 261, the outputs of the counters 261 and 262 are all "0" becouse of the relation 80−80=0 and a signal shown by (815) in FIG. 8 appears at the BORROW terminal of the counter 262 for displaying "the second order". This signal 815 and the output sigaal 807 of the BORROW terminal of the counter 261 for displaying "the first order" are supplied to a NOR gate 281 of the discrimination circuit 109, at the output of which appears a signal 820 rising to "1" at the time C$_2$. Since this signal 820 is supplied to the clock terminal of a D type flip-flop 283; at the time C$_2$, the output Q of the D type flip-flop 283 becomes "1" while the output $\overline{Q}$ becomes "0". Thus, the gate of the NAND gate 272 in the switch circuit 108 is opened while that of the NAND gate 273 is closed. As a result, a pulse signal shown by (802) in FIG. 8 appears at the output of the NAND gate 272. Since this signal 802 is supplied to the COUNT UP terminal of the counter 261; after the time C$_2$, the outputs of the counters 261 and 262 provide signals with their pulses increasing in response to the number of input pulses. During the time interval between the time C$_3$ and the time C$_4$, the outputs Q$_A$, Q$_B$, Q$_C$ and Q$_D$ of the counter 261 are "1", "0", "0" and "1", respectively, and the outputs Q$_A$, Q$_B$, Q$_C$ and Q$_D$ of the counter 262 are "1", "0", "0" and "0", respectively, so that the display means 291 for displaying "the first order" displays "9" while the display means 292 for displaying "the second order" displays "1", in preparation for entirely displaying the result 80−99=−19.

Further, since the signal 821 from the output Q of the D type flip-flop 283 which has become "1" at the time C$_2$ is supplied to the D terminal of the next step D type flip-flop 284, whose clock terminal is supplied with a signal obtained by inverting through an inverter gate 282 the memory signal 605 as the output of a NAND gate 253; a signal 822 which rises to "1" at the time C$_3$ appears at the output Q of the D type flip-flop 284. This signal 822 is inverted through an inverter gate 285 to reach a display means 293 at its terminal which causes the display means 293 to display the minus sign, so as to make the display means 293 display the minus sign. Thus, the figures with minus symbol "−19" are displayed in the display circuit 110, which means that the temperature of air as a medium to be measured is −19° C.

Although, in the above-described embodiment, the measurement operation is made by means of the phase differenct $T_1$ (FIG. 3, 314) between the signals of the transmitting means and the receiving means, the same measurement may be made by means of the pulse width To which is obtained by subtracting the phase difference $T_1$ from the period of the synchronizing signal. In this case, the pulse width To is widened, contrary to the above-described embodiment, as the temperature is increased. Thus, by reversing the operation of up-counting and down-counting in the up-down counters 261 and 262 to set respective data inputs, the same performance as that in the above-described example can be evidently obtained. Further, although, in the above-described embodiment, the oscillation frequency is 1/100 frequency-divided to form the reference signal as shown in FIG. 2, the factor of frequency-division is not limited to the above-described value but determined by the excitation frequency of the ultrasonic vibrator.

In the above-described embodiment, in order to make display with stability, the modulated pulses from the modulation circuit 103 are accumulated by the accumulation circuit 104, the mean value of the number of the modulated pulses over a predetermined time interval is calculated by the time signal circuit 105, and this signal is supplied to the counter circuit 107 to drive the display circuit 110 for displaying the mean value. However, the modulated pulses may be supplied directly to the counter circuit 107 to be accumulated, without performing the averaging operation.

In the above-described embodiment, the output of the counter circuit 107 is supplied to the display circuit 110 for digital display. However, a movable coil type ampere meter or the like instead of this display circuit 110 may be employed for analogue display.

Further, although, in the above-described embodiment, the output of the counter circuit 107 is used for display, the output may be supplied, other than for display, to another electronic control device serving as a temperature sensor. In this case, when the frequency of the high frequency pulses which are to be supplied to the NAND gate 503 in the modulation circuit is set to be higher, the temperature can be detected with higher accuracy. Thus, by suitably matching the frequency setting of high frequency pulses with the rapid detection responsibility, the use of such temperature sensor makes possible the rapid electronic control to the temperature change.

Still further, although, in the above-described embodiment, the temperature of air as a medium to be measured is measured; of course, the medium is not limited to air but may be any other material which permits ultrasonic wave to propagate therethrough, for example, various kinds of gases such as oxygen, nitrogen, helium or the like, some kinds of liquid such as water, oil or the like, and even some kinds of solid such as iron, wood or the like. However, in these cases, the parameters such as the distance between the transmitting means and the receiving means, the excitation frequency, or the constants of the determination circuit must be adjusted in view of different conditions of acoustic wave propagation for different mediums.

We claim:

1. An apparatus for measuring the temperature of an object which is a medium for ultrasonic sound wave propagation, said apparatus comprising:
   pulse generator means for generating first pulse signals continuously at a predetermined frequency;
   transmitter means for transmitting ultrasonic sound waves toward said object in synchronized relation with said first pulse signals of said pulse generator means;
   receiver means for receiving said ultrasonic sound waves transmitted through said object at a location spaced from said transmitter means by a predetermined distance, said receiver means generating second pulse signals in synchronized relation with the received ultrasonic sound waves, said receiver means including,
   a transducer for producing transducer signals across output terminals thereof in response to said received ultrasonic sound waves, and
   a comparator connected to receive said transducer signals across input terminals thereof for converting said signals into said second pulse signals, said comparator being provided with a resistor between the output terminal and one of said input terminals thereof such that said second pulse signals is kept independent of the temperature;
   detector means for detecting the phase difference between said first and second pulses to generate third pulse signals having time intervals equal to the detected phase difference; and
   measuring means for measuring said time intervals of said third pulses to provide output values indicative of the temperature of said object in proportion to the measured time interval.

2. An apparatus according to claim 1, wherein said measuring means includes:
   a reference oscillator for generating oscillation signals at a predetermined reference frequency higher than said predetermined frequency of said first pulse signals;
   a counter connected to said reference oscillator for counting said oscillation signals during said time intervals of said third pulses generated by said detector means; and
   a display unit connected to said counter for displaying a digital value indicative of the temperature of said object in accordance with the output count value of said counter.

3. An apparatus according to claim 2, wherein said reference oscillator and said pulse generator means are connected via a first signal line, wherein said detector means and said counter of said measuring means are connected via a second signal line, and wherein said pulse generator means includes a frequency divider dividing said oscillation signals in frequency into said first pulses.

4. An apparatus for measuring the temperature of an object which is a medium for ultrasonic sound wave, said apparatus comprising:
   pulse generator means for generating a train of first pulse signals at a fixed frequency;
   transmitter means for transmitting ultrasonic sound waves toward said object in timed relation with said first pulse signals of said pulse generator means;

receiver means for receiving said ultrasonic sound waves transmitted through said object at a location spaced from said transmitter means, said receiver means generating a train of second pulse signals in timed relation with the received ultrasonic sound waves, said receiver means includes;

a transducer for producing transducer signals across output terminals thereof in response to said received ultrasonic sound waves; and a comparator connected to receive said transducer signals across input terminals thereof for converting said signals into said second pulse signals, said comparator being provided with a resistor between the output terminal and one of said input terminals thereof such that said second pulse signals is kept independent of the temperature;

logic means for subjecting said first pulse signals and said second pulse signals to a predetermined logic operation to generate a train of third pulse signals having time intervals corresponding to the phase difference between said first pulse signals and said second pulse signals generated at the same instant in time; and utilization means for utilizing said third pulse signals to measure the temperature of said object.

5. An apparatus for measuring the temperature of an object which is a medium for ultrasonic sound wave, said apparatus comprising:

pulse generator means for generating a train of first pulse signals at a fixed frequency;

transmitter means for transmitting ultrasonic sound waves toward said object in timed relation with said first pulse signals of said pulse generator means;

receiver means for receiving said ultrasonic sound waves transmitted through said object at a location spaced from said transmitter means, said receiver means generating a train of second pulse signals in timed relation with the received ultrasonic sound waves;

logic means for subjecting said first pulse signals and said second pulse signals to a predetermined logic operation to generate a train of third pulse signals having time intervals corresponding to the phase difference between said first pulse signals and said second pulse signals generated at the same instant in time; and utilization means for utilizing said third pulse signals to measure the temperature of said object, said utilization means includes;

oscillator means for generating clock signals;

another logic means for subjecting said third pulse signals and said clock signals to another predetermined logic operation; and counter means for counting said clock signals passed through said another logic means to provide output values indicative of the temperature of said object.

6. An apparatus according to claim 5 further comprising; frequency divider means for dividing said clock signals in frequency by a predetermined number;

first electric wire means for connecting said frequency divider means and said first pulse generator means so that said first pulse generator means may be positioned apart from said frequency divider means; and second electric wire means for connecting said logic means and said another logic means so that said logic means may be positioned apart from said another logic means;

and wherein said first pulse generator means includes:

another frequency divider means for dividing the output signals of said frequency divider means in frequency by two to generate said first pulse signals.

* * * * *